(No Model.)

B. STERN.
NASAL DOUCHE.

No. 507,567. Patented Oct. 31, 1893.

WITNESSES:
Edward C. Rowland.
E. Simpson.

INVENTOR
Benjamin Stern
BY Phillips Abbott
ATTORNEY

UNITED STATES PATENT OFFICE.

BENJAMIN STERN, OF NEW YORK, N. Y.

NASAL DOUCHE.

SPECIFICATION forming part of Letters Patent No. 507,567, dated October 31, 1893.

Application filed March 13, 1893. Serial No. 465,852. (No model.)

*To all whom it may concern:*

Be it known that I, BENJAMIN STERN, a citizen of the United States, and a resident of New York city, in the county of New York and State of New York, have invented certain new and useful Improvements in Nasal Douches, of which the following is a specification.

My invention relates to improvements in nasal douches and it consists in a peculiar construction of the interior of the douche so that a layer or cake of medicated material may be placed and firmly held in the bottom of the douche whereby the vessel will always be ready for immediate use, and it will not be necessary to mix or prepare the medicated solution at each time of use as has been necessary heretofore. This is a very inconvenient thing to do and particularly for travelers who lack the necessary facilities and frequently suitable opportunity.

Figure 2:
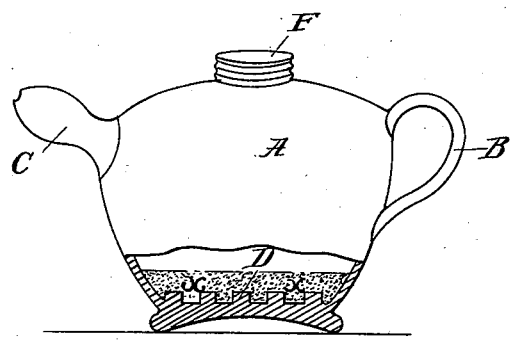
Figure 1:
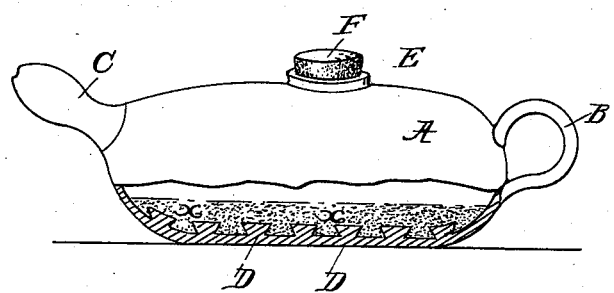

In the drawings, Figure 1, illustrates an elevation, partly in section, of the invention. Fig. 2, illustrates a similar view of a modification.

A, is the cup or douche.
B, is the handle.
C, is the spout.

The bottom of the douche interiorly is corrugated, preferably with undercut or dovetail bars or ribs, D, (see Fig. 1,) which extend across the bottom of the douche from side to side. In Fig. 2, the corrugations are square in cross section.

The medicated material in the form of a thin paste or otherwise as preferred, is put into the douche, which will embed itself about the corrugations and become dry therein and hard; it is shown at X. Thereafter, instead of having to mix or prepare the material in liquid form and insert it in the douche at each time of use, all that is necessary is to put into the douche, from an ordinary faucet or otherwise, a small quantity of water, which will dissolve in a moment or two a small part of the dried cake or deposit of medicated material, and it being then used, the balance of the water will be turned out. In this way the instrument is always charged ready for use. It will be seen, however, that since the cake or deposit of dried material permanently remains in the douche until it is used up, it is desirable to protect it from dirt and other fouling agencies. Consequently my douches are preferably not open as heretofore, but I carry up or form upon them, a neck, E, similar to the neck of a bottle, and provide the same with a cork or other stopper, F.

The medicated material differs in ingredients for different nasal treatments or affections. Some kinds will not harden so thoroughly as others and some are more apt to crumble than others. Consequently I sometimes make the corrugations in the bottom of the douche undercut, as shown in Fig. 1, the better to retain the medicated material; in other instances, the corrugations may be square as shown in Fig. 2, or of any suitable shape. When it has become largely used up, or whenever a fresh supply is desired, the douche may be cleaned of the previous deposit by a somewhat extended soaking in warm water, with or without chemicals added to dissolve the material.

The reason I corrugate the bottom of the douche instead of putting a cake of the medicated material into the cup loose, is that the material is too strong medicinally for direct application to the delicate membranes of the nose; consequently it is necessary to confine the cake, so that a solution of it only will be applied to the nasal membranes and to avoid the possibility of any pieces of the cake passing into the nose, I confine it so that it cannot move or become broken or chipped.

I claim—

A nasal douche having a spout with a bulb on its end, and provided with corrugations on its interior bottom, adapted to engage with and hold a deposit of medicated material, substantially as set forth.

Signed at New York, in the county of New York and State of New York, this 7th day of March, A. D. 1893.

BENJAMIN STERN.

Witnesses:
GEO. R. STORM,
P. J. MONTAGUE.